(12) United States Patent
Bunch et al.

(10) Patent No.: US 6,553,663 B2
(45) Date of Patent: Apr. 29, 2003

(54) METHOD OF INSTALLING A PROTECTIVE CONNECTOR ASSEMBLY IN A HERMETIC COMPRESSOR

(75) Inventors: Rick L. Bunch, Tecumseh, MI (US); Jack M. Curtiss, Tecumseh, MI (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/902,384

(22) Filed: Jul. 10, 2001

(65) Prior Publication Data

US 2002/0029469 A1 Mar. 14, 2002

Related U.S. Application Data

(60) Provisional application No. 60/220,563, filed on Jul. 25, 2000.

(51) Int. Cl.[7] .............................................. H01R 43/00
(52) U.S. Cl. ...................... 29/857; 339/38; 339/60 R; 339/61 R
(58) Field of Search ....................... 29/857, 596, 598, 29/747, 888.02, 244, 254; 339/38, 60 R, 61 R, 94 A, 103 B

(56) References Cited

U.S. PATENT DOCUMENTS

| 4,601,528 | A | * | 7/1986 | Spier | ........................... 439/148 |
|---|---|---|---|---|---|
| 4,632,487 | A | * | 12/1986 | Wargula | ...................... 439/471 |
| 4,711,509 | A | * | 12/1987 | Cross et al. | ................. 439/587 |
| 5,467,526 | A | * | 11/1995 | Kunkel et al. | ................. 29/747 |
| 6,173,488 | B1 | * | 1/2001 | Endo et al. | .................... 29/747 |
| 6,133,932 | A1 | * | 9/2002 | Zeiler et al. | .................. 29/596 |

* cited by examiner

*Primary Examiner*—I Cuda Rosenbaum
*Assistant Examiner*—Stephen Kenny
(74) *Attorney, Agent, or Firm*—Baker & Daniels

(57) ABSTRACT

A method of installing a connector assembly relative to a terminal assembly of a hermetic compressor assembly, including: aligning the connector assembly with the terminal assembly; positioning an installation tool on the connector assembly; actuating the installation tool; and seating the connector assembly into the terminal assembly. Also, a method of installing a connector assembly relative to a terminal assembly of a hermetic compressor assembly, including: aligning the connector assembly with the terminal assembly; positioning an installation tool on the connector assembly; pneumatically applying force to the connector assembly through the installation tool until a predetermined pneumatic pressure has been reached; seating the connector assembly into the terminal assembly when or before the predetermined pressure has been reached; and retracting the tool after the connector assembly has been seated into the terminal assembly.

20 Claims, 12 Drawing Sheets

FIG_1

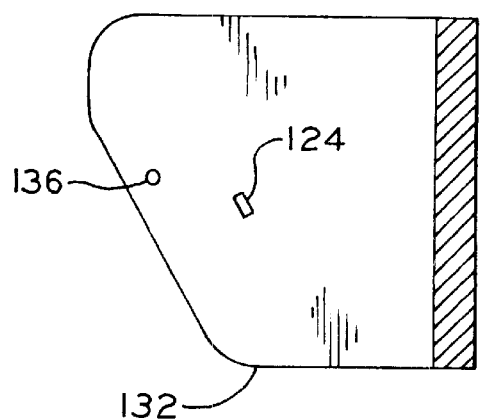
FIG_9
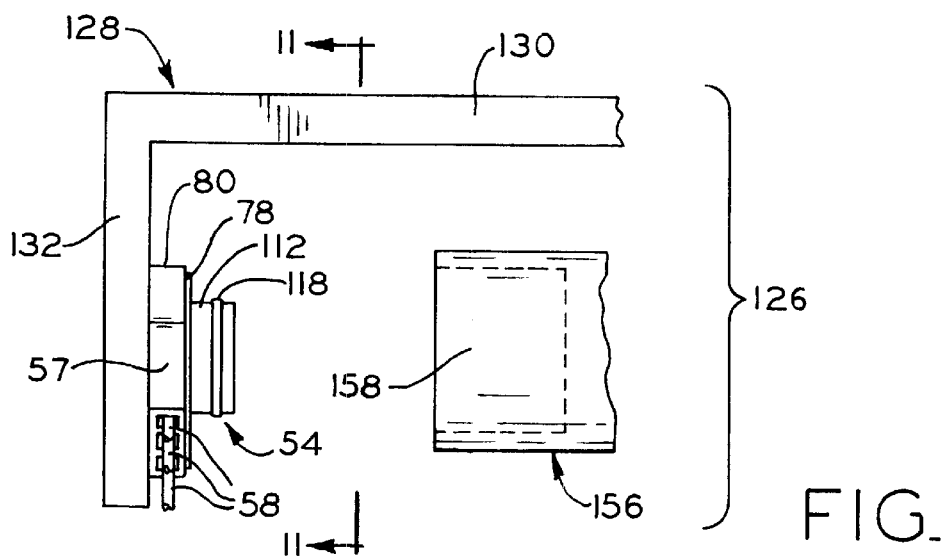
FIG_10
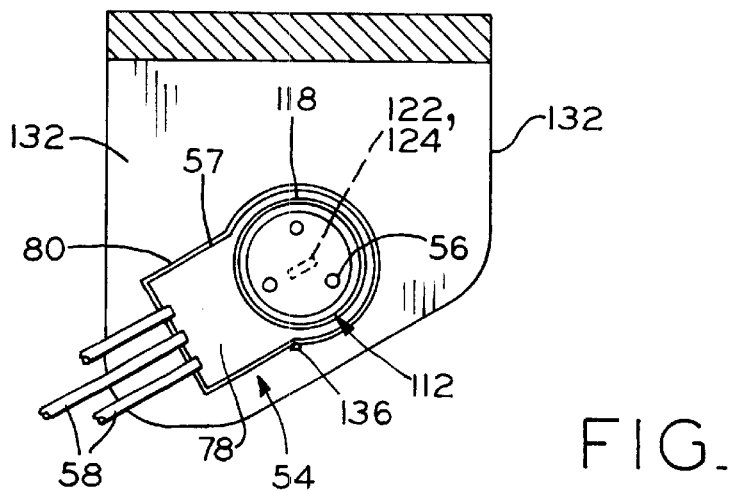
FIG_11

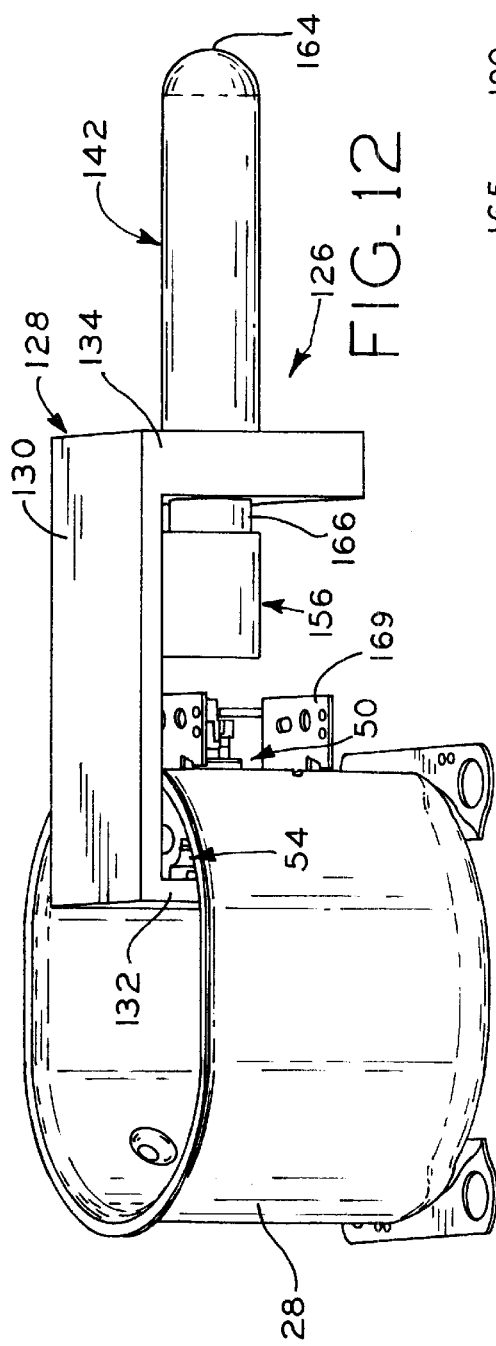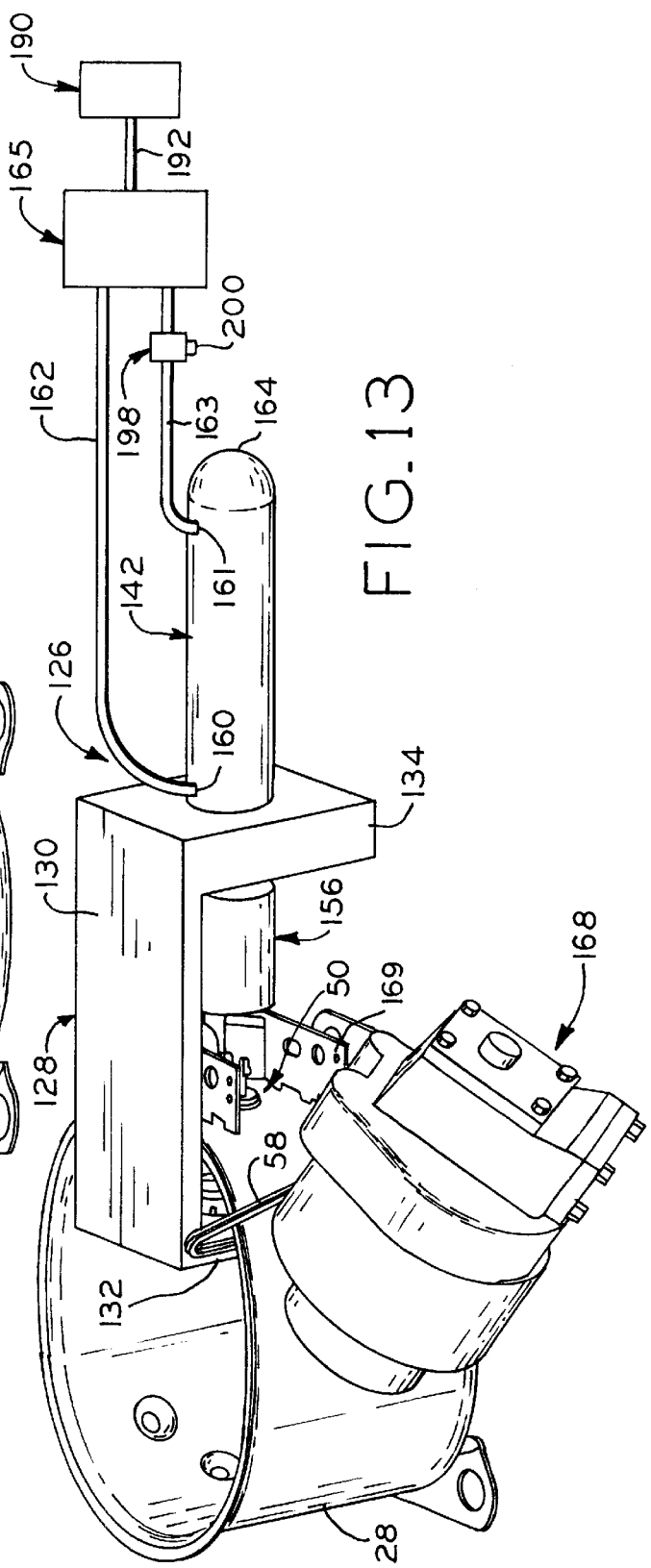

METHOD OF INSTALLING A PROTECTIVE CONNECTOR ASSEMBLY IN A HERMETIC COMPRESSOR

CROSS-REFERENCE TO RELATED APPLICATION

This application is related to and claims the benefit under 35 U.S.C. 119(e) of U.S. Provisional Patent Application Ser. No. 60/220,563, filed Jul. 25, 2000.

BACKGROUND OF THE INVENTION

The present invention relates to electrical connections internal to hermetic compressor assemblies and methods of quickly and effectively installing same, particularly with regard to connectors designed to protect against electrical arcing across carbon deposits which may be formed within the compressor assembly.

The terminal assembly extending through the sealed shell or housing of a hermetic compressor includes a plurality of conductor pins which extend through apertures located in the terminal body. The terminal body is usually welded or brazed into an aperture provided in the compressor assembly housing. The conductor pins are secured within these apertures, and are electrically insulated from the terminal body and the housing, by fused glass insulators. An electric motor having a stator and a rotor is located within the housing, the rotor operatively coupled to a compression mechanism. The interior ends of the conductor pins are connected to lead wires which are connected to the windings of the motor stator. The exterior ends of the conductor pins are selectively connected, as through a switch device, to a source of electrical power. Thus, the motor is energized by the external power source through the terminal body, the lead wires, and the electrical connections therebetween. The electrical connections typically include an electrical connector attached to each lead wire which is engaged with a corresponding conductor pin. A plurality of connectors, and portions of their respective lead wires, are normally assembled into, and housed by, a cluster block which comprises the connector assembly. The cluster block is dielectric, usually constructed from an injection molded plastic, and facilitates quick assembly of the lead wires to the terminal assembly. The cluster block insulates the electrical connectors therein from each other, from the terminal assembly, and from the compressor housing, to a substantial degree. Usually, the interior of the cluster block is formed with separated passageways, each of which receives one lead wire, and recesses for each of the connectors attached to the ends of the lead wires. Passageways leading to these connectors are provided through the cluster block material, the conductor pins of the terminal assembly extending therethrough.

During compressor operation, carbon or other conductive deposits from the motor may collect on the interior surfaces of the housing and terminal assembly. These deposits may provide a conductive path between elements at differing electrical potentials, and a short circuit or arc may develop along that path. Such arcing results in resistive heating of the deposits along the conductive path, which heats the elements on which the deposits collect. Such heating is known to sometimes cause the fused glass insulators about the conductor pins to melt, thereby causing the compressor housing to leak pressurized gas at the terminal assembly.

Prior hermetic compressor assemblies often include some means for impeding such arcing, these means are usually designed to prevent the conductive deposits from collecting on the interior surface of the terminal assembly and its glass insulators. These means include electrical connector or cluster block assemblies, through which the lead wires are attached to the interior ends of the conductor pins, which, when assembled to the terminal assembly, substantially covers same. Prior connector assemblies have not completely precluded the formation of a conductive path between the lead wire ends or electrical connectors within the cluster block, and the terminal body or compressor housing.

Some of these connector assemblies means may include sealing features which help prevent the conductive deposits from entering the interior of the terminal assembly past its interface with the cluster block. One such cluster block assembly includes a cylindrical exterior wall portion which sealingly engages the cylindrical interior surface of the terminal body, as by an interference fit; the cylindrical interface may also include additional sealing means such as an O-ring. A problem associated with prior connector assemblies which sealably engage the terminal assembly in this manner is that they may be improperly installed, the proper seating of the block relative to the terminal assembly being hindered by the interference fit between the terminal body and the cluster block, or the O-ring therebetween.

One method of connecting prior connector assemblies involves an assembly operator manually forcing the cluster block into its fully installed position within the terminal body. Other methods involve the use of tools such as pliers or a hammer to make this connection. There are problems associated with these prior installation techniques: When manually installing the cluster block, the person installing the block may not be physically able to force the cluster block into the terminal body far enough to create the sealing engagement required to prevent debris from entering the terminal assembly. When using pliers or a hammer to effect installation of the connector assembly, damage to the cluster block, such as deformation, cracking or splitting thereof, may occur. Thus, improper installation of the connector assembly to the terminal assembly may result in an open circuit, carbon being deposited on the interior of the terminal assembly, or damage to the assembled parts.

It is desired to provide a connector assembly and an installation method therefor, which ensure that the connector assembly is properly installed to the terminal assembly easily and consistently, protect against the formation of undesirable conductive paths, and thus electrical arcing, within the compressor assembly, and avoid the above-mentioned shortcomings of previous connector assemblies and installation methods.

SUMMARY OF THE INVENTION

The present invention relates to a connector assembly which is installed into the terminal assembly and protects against the formation of undesirable conductive paths thereacross, which may result in electrical arcing. The present invention also relates to a method for installing the connector assembly easily and consistently, and without damage to the connector assembly. The cluster block of the inventive connector assembly is provided with a feature engaged by an tool during installation; through use of the inventive method, the connector assembly is properly installed easily and consistently, and without the risk of damage thereto.

The tool includes a body portion having two legs, one of which is outside the compressor housing during assembly and supports a pneumatic cylinder, the other of which is inside the compressor housing during assembly and engages the cluster block. The latter leg is provided with a recess or a protrusion which respectively engages a protrusion or a recess provided on the cluster block. The connector assembly is loosely assembled onto the conductor pins of the terminal assembly. As the pneumatic cylinder advances toward the outer surface of the compressor housing, the cluster block is forced into sealing engagement with the terminal body. The force exerted on the cluster block by the tool is automatically controlled to ensure proper seating of the cluster block relative to the terminal body, thereby ensuring that the interior of the terminal assembly is protected from carbon deposits forming therein, and to prevent damage to the assembled parts.

The present invention provides a method of installing a connector assembly relative to a terminal assembly of a hermetic compressor assembly including: aligning the connector assembly with the terminal assembly; positioning an installation tool on the connector assembly; actuating the installation tool; and seating the connector assembly into the terminal assembly.

The present invention further provides a method of installing a connector assembly relative to a terminal assembly of a hermetic compressor assembly including: aligning the connector assembly with the terminal assembly; positioning an installation tool on the connector assembly; pneumatically applying force to the connector assembly through the installation tool until a predetermined pneumatic pressure has been reached; seating the connector assembly into the terminal assembly when or before the predetermined pressure has been reached; and retracting the tool after the connector assembly has been seated into the terminal assembly.

The present invention also provides a tool for installing a connector assembly to the terminal assembly of a hermetic compressor assembly. The tool includes a body member which supports a pneumatic cylinder. Means are provided on the body member for ensuring proper alignment of the tool with the connector assembly during installation of the connector assembly to the terminal assembly.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 9 is a sectional view of the tool of FIG. 7, taken along the line 9—9;

FIG. 10 is a fragmentary view of the tool of FIG. 7, also showing the connector assembly of FIG. 3 positioned on the tool;

FIG. 11 is a sectional view of the installation tool and connector assembly along line 11—11 of FIG. 10;

FIG. 12 is a perspective view of the installation tool of FIG. 7, shown positioned on a compressor assembly housing portion;

FIG. 13 is a perspective view of the installation tool and compressor assembly housing portion of FIG. 12, also showing a compressor/motor subassembly;

Figure 1:
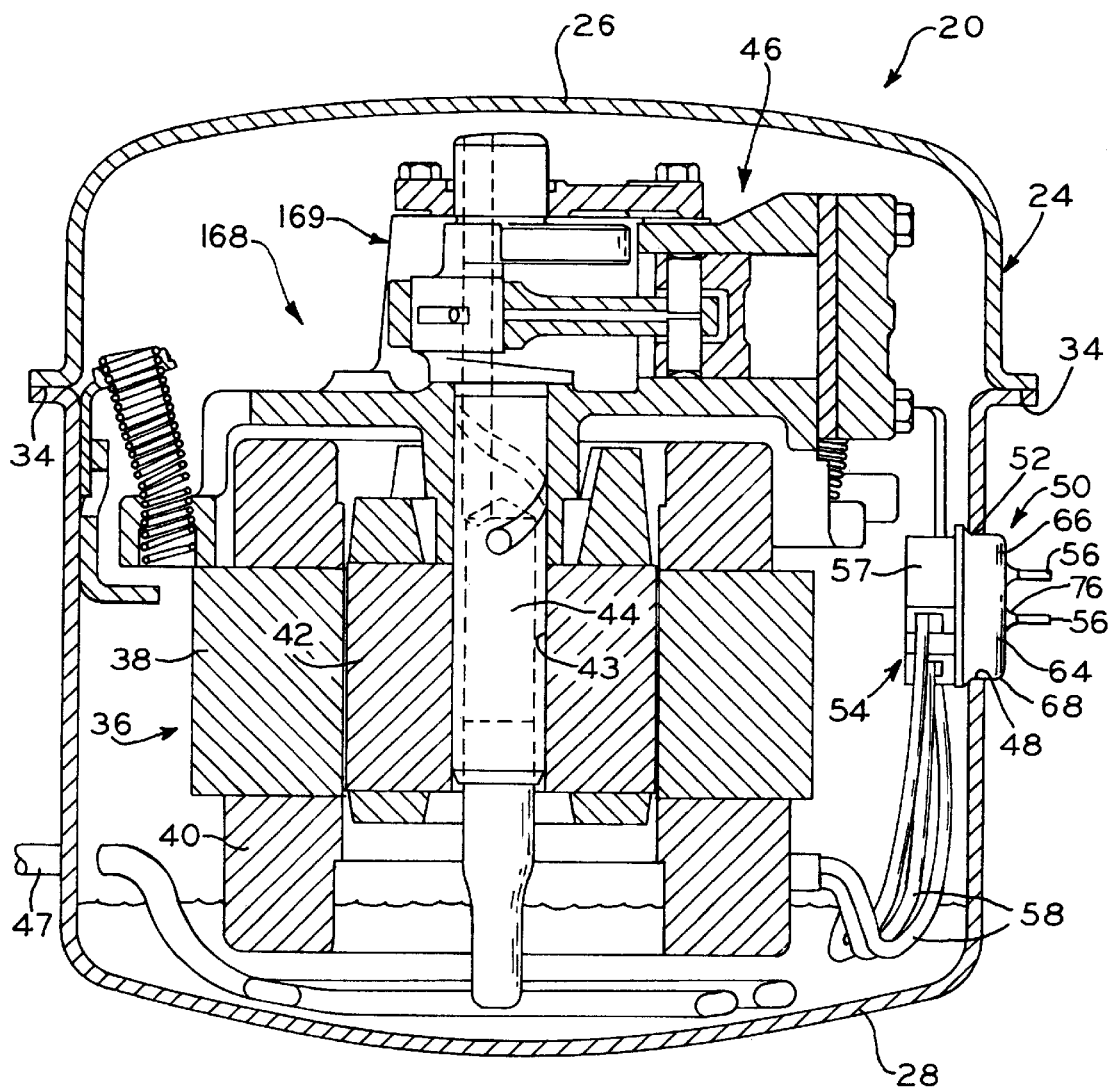
FIG. 1 is a longitudinal sectional view of a vertical rotary compressor in accordance with the present invention.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE INVENTION

Figure 2:
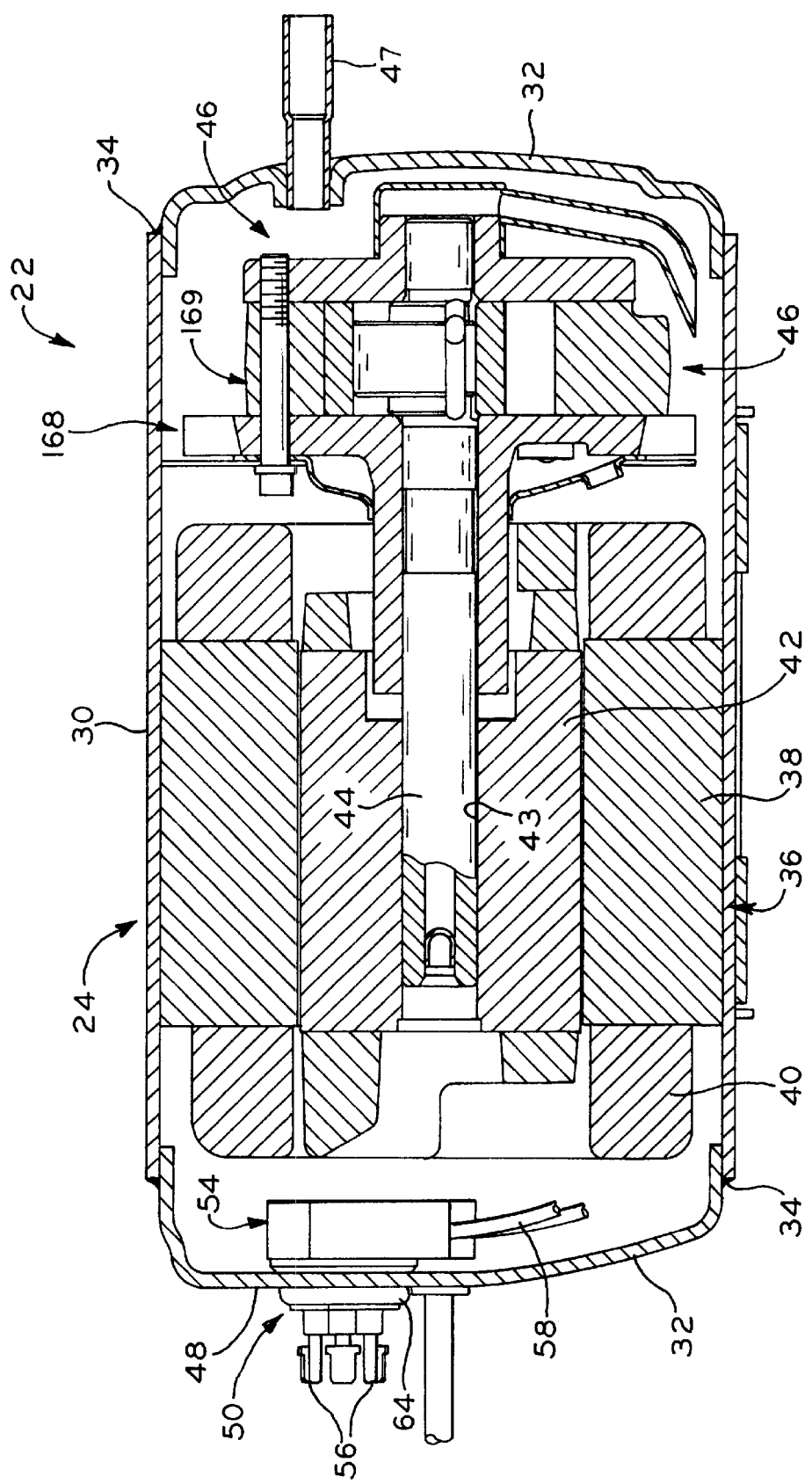
FIG. 2 is a longitudinal sectional view of a horizontal rotary compressor in accordance with the present invention.

Referring to FIGS. 1 and 2, reciprocating compressor assembly 20 and rotary compressor assembly 22 are shown as examples of types of hermetic compressor assemblies in which the present invention may be advantageously used. Other hermetic compressor types, such as, for example, a scroll compressor assembly, may also benefit from use of present invention.

Reciprocating compressor assembly 20 comprises housing 24 which includes upper housing portion 26 disposed atop lower housing portion 28. Housing 24 of rotary compressor assembly 22 includes main housing portion 30 and two end portions 32 (FIG. 2). The housing portions for both compressor assemblies 20 and 22 are hermetically sealed at 34 by a method such as welding, brazing or the like.

Hermetic compressor assemblies 20 and 22 each also include electric motor 36 disposed within housing 24. Motor 36 comprises stator 38 provided with windings 40, and rotor 42, which is surrounded by stator 38. Rotor 42 has central aperture 43 in which drive shaft or crankshaft 44 is secured by an interference fit.

As shown, an end of drive shaft 44 is operatively connected to compression mechanism 46, which may be of the reciprocating piston type, as in compressor assembly 20, the rotary type, as in compressor assembly 22, or the scroll type (not shown), each of which are well-known in the art. The general structure and operation of a reciprocating compressor assembly is disclosed in U.S. Pat. No. 5,266,016, the disclosure of which is expressly incorporated herein by reference. The general structure and operation of a rotary compressor assembly is disclosed in U.S. Pat. No. 5,222,885, the disclosure of which is expressly incorporated herein by reference. The general structure and operation of a scroll compressor assembly is disclosed in U.S. Pat. No. 5,306,126, the disclosure of which is expressly incorporated herein by reference. Each of these patents is assigned to Tecumseh Products Company.

The compressor assembly, which may be part of a refrigeration system (not shown) also comprising heat exchangers, an expansion device and refrigerant conveying lines, receives refrigerant substantially at suction pressure and discharges it substantially at discharge pressure. The compressor assembly may be of a "high side" type, in which the portion of the housing in which the motor is located is at discharge pressure, or of a "low side" type, in which the portion of the housing in which the motor is located is at suction pressure. The present invention may be beneficially employed in either type.

Rotary compressor assembly 22 (FIG. 2) is of the high side type, and in operation, suction pressure refrigerant gas is drawn from outside its housing 24 directly into its compression mechanism 46 via a suction tube (not shown). Within compression mechanism 46, the suction pressure gas is compressed to a higher, discharge pressure, and then discharged from the compression mechanism into its housing 24 substantially at discharge pressure. Thereafter, the compressed gas is exhausted from the housing through discharge tube 47 and recirculated through the refrigerant system.

Reciprocating compressor assembly 20 (FIG. 1) is of the low side type, and in operation suction pressure refrigerant gas is drawn first into housing 24, and then into compression mechanism 46, the compressed gas then discharged directly from the compression mechanism and the housing via discharge tube or shock loop 47 and recirculated through the refrigerant system.

Figures 3, 4:
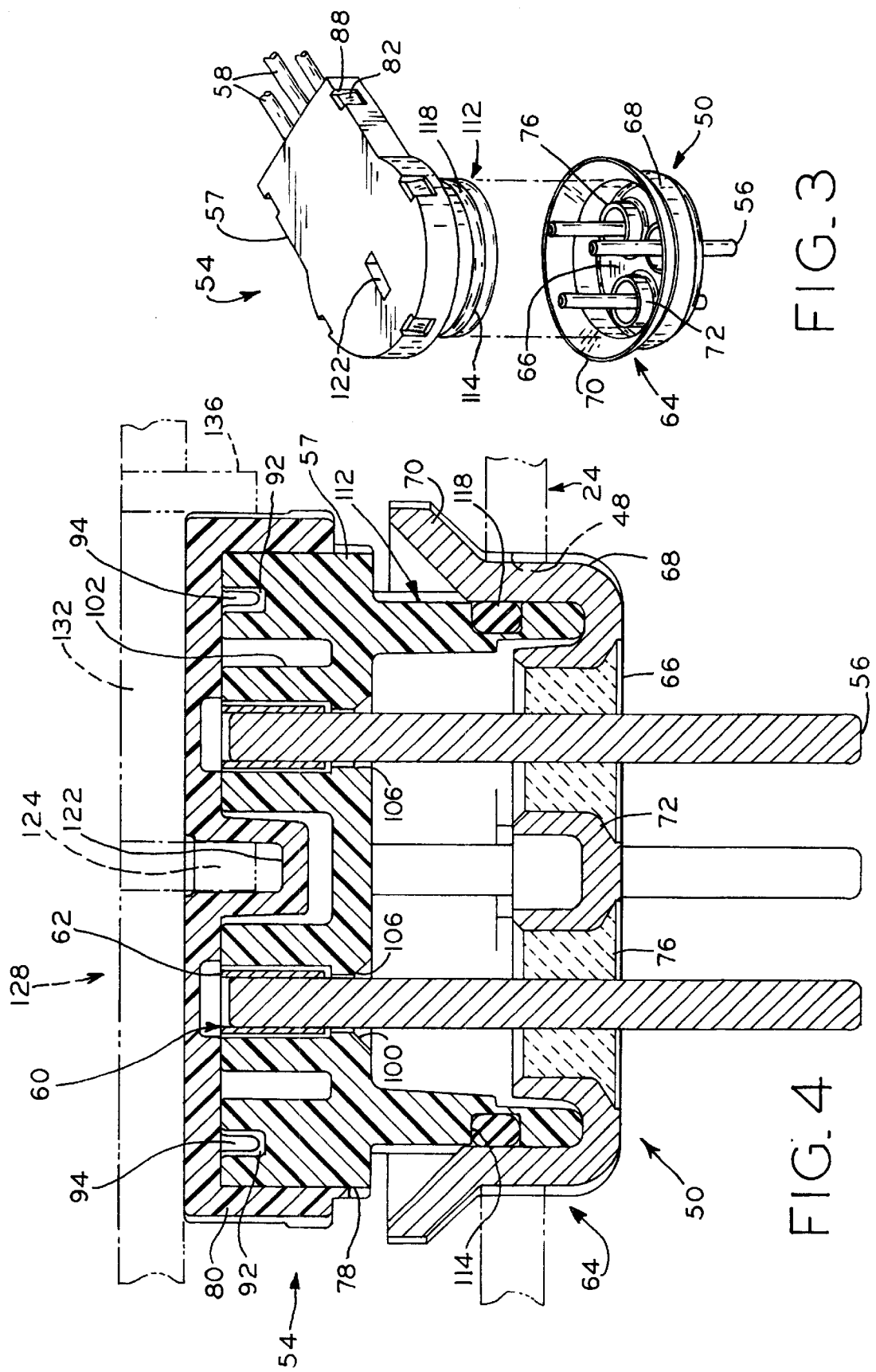
FIG. 3 is an exploded view of one embodiment of the inventive connector assembly and a terminal assembly.
FIG. 4 is a sectional view of the connector assembly and terminal assembly of FIG. 3, installed, showing the positioning of the installation tool.

In lower housing portion 28 of low side reciprocating compressor 20 (FIG. 1) and one of end portions 32 of high side rotary compressor 22 (FIG. 2) is aperture 48, into which terminal assembly 50 is fitted and sealably secured at 52 by welding, brazing or the like. In the manner discussed above, an external power source is electrically connected to conductor pins 56 of the terminal assembly, which are connected, through inventive connector assembly 54 and jacketed lead wires 58 to stator windings 40. As shown in FIG. 4, each lead wire 58 is positioned within plastic cluster block 57 of connector assembly 54, its uninsulated portion and is mechanically crimped and electrically connected at 60 to electrical connector clip 62, which engages the interior end of a conductor pin 56 in a manner which will be described in more detail hereinafter. Once electrical connection 60 is made, electrical power is transferred from the external power source to stator windings 40 via pins 56 of terminal assembly 50 and lead wires 58. Energized, the stator electromagnetically induces rotation of rotor 42 to drive compression mechanism 46 through drive shaft 44.

Terminal assembly 50 includes metallic, cup-shaped terminal body 64 having end wall 66 and cylindrical side wall 68, as best seen in FIGS. 3 and 4. Terminal body side wall 68 is integrally formed with end wall 66 and extends approximately perpendicularly therefrom. Integral with the annular edge of side wall 68 opposite end wall 66 is flange 70, which abuts the interior periphery of housing aperture 48 (FIGS. 1, 2, 14 and 15). Located in end wall 66 is a plurality (usually three) of inwardly projecting collars 72 which extend substantially parallel with side wall 68 and define apertures 74 through which conductor pins 56 pass through terminal body 64 (FIG. 4). A fused glass insulator 76 is formed in each aperture 74 and attaches conductor pin 56 to collar 72. Pins 56 are electrically insulated from terminal body 64, housing 24, and each other, by insulators 76, which also form a hermetic seal for housing 24.

As discussed above, unless measures are taken to prevent it, arcing may occur across terminal assembly 50 between lead wires 58 or conductor pins 56, and terminal body 64 or compressor housing 24 along a conductive path established by debris produced during compressor operation. To protect against the possibility of arcing between lead wires 58 or conductor pins 56, and terminal body 64 or compressor housing 24, cluster block 57 sealingly engages the inner surface of terminal body 64 (FIG. 4). Further, the uninsulated portions of lead wires 58, to which electrical connector clips 62 are attached, are sealably disposed within cluster block 57.

Figure 6:
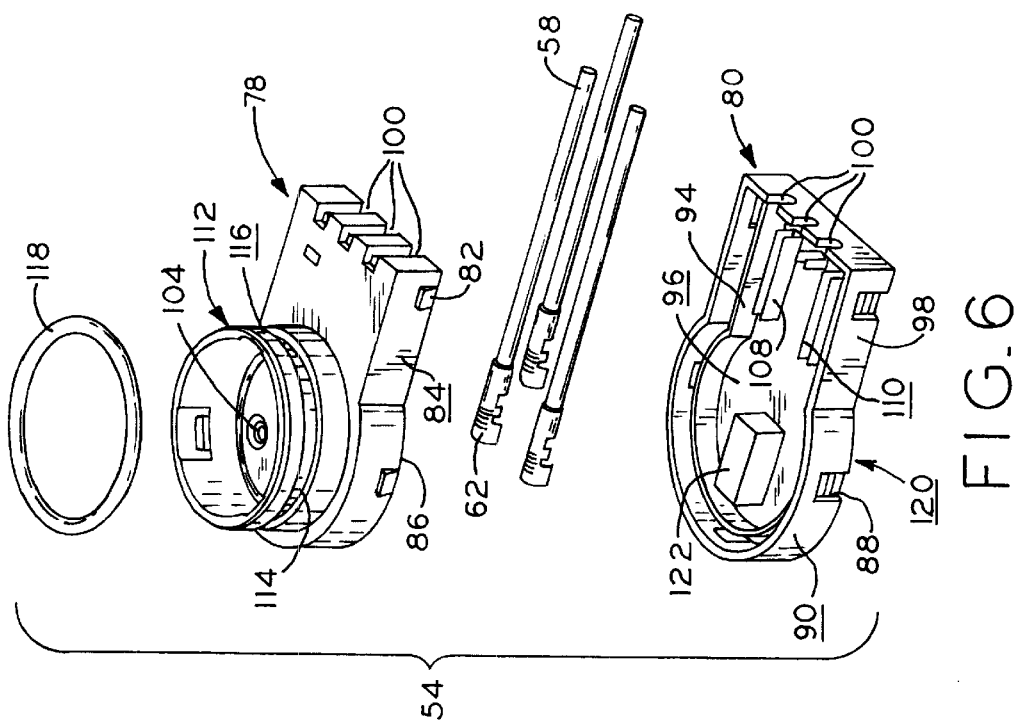
FIG. 6 is a second exploded view of the connector assembly of FIG. 3.
Figure 5:
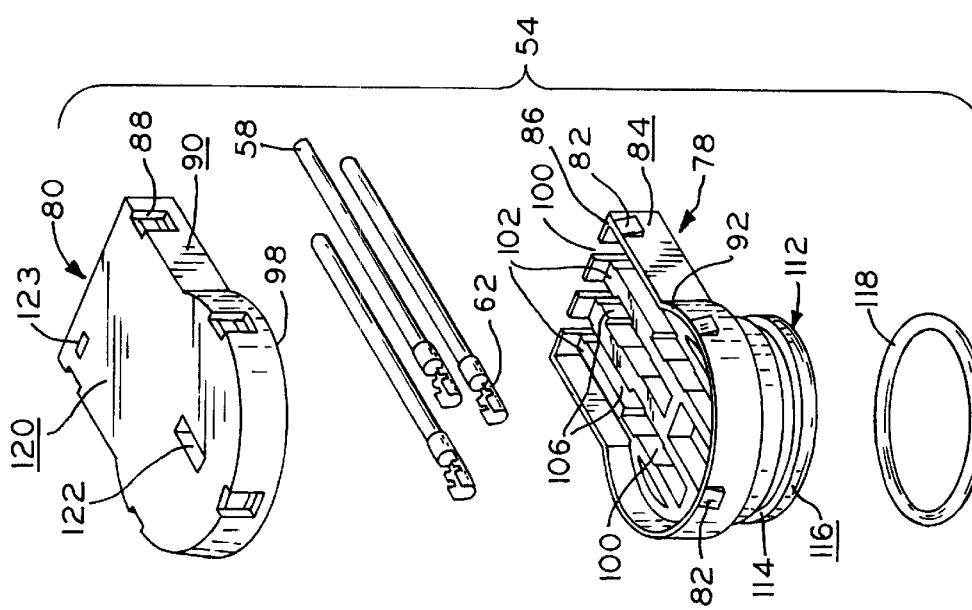
FIG. 5 is a first exploded view of the connector assembly of FIG. 3.
Figure 7:
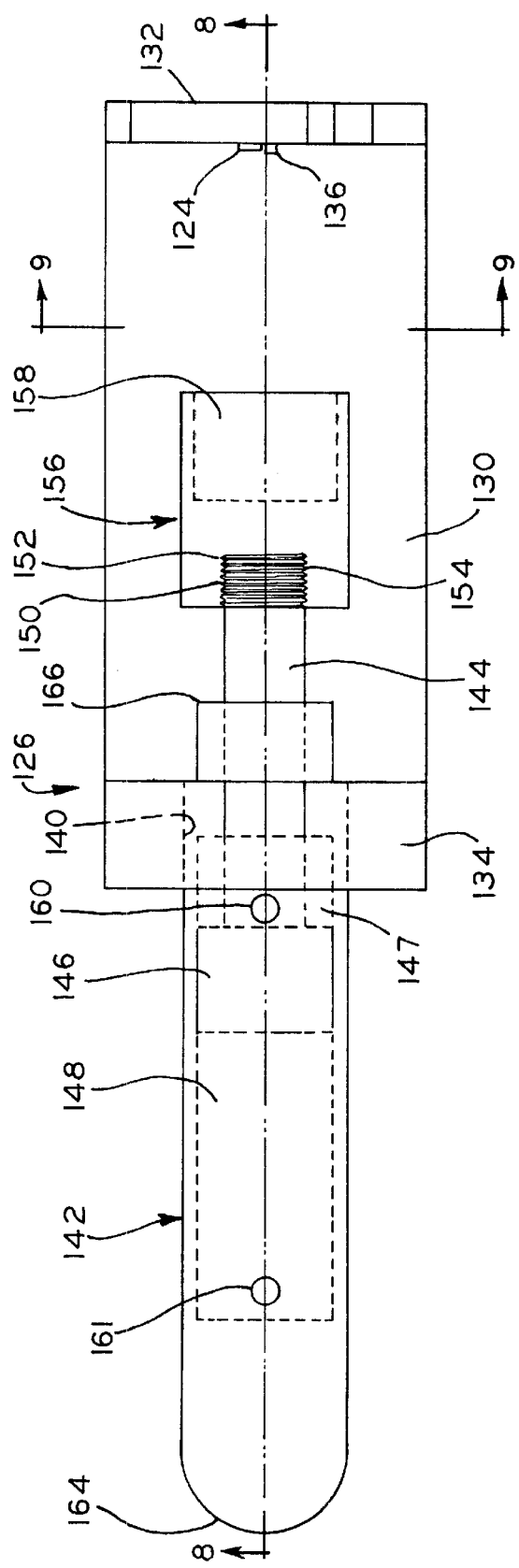
FIG. 7 is a plan view of one embodiment of an inventive installation tool.

Referring to FIGS. 5 and 6, cluster block 57 includes base 78 and cover 80 which are secured together. Base 78 is injection molded plastic and is provided with integral tabs 82 which protrude outwardly from outside surface 84 thereof. Tabs 82 are equally spaced around the periphery of base 78 adjacent edge 86. Cover 80 is also injection molded plastic and is provided with slots 88 in outer surface 90 of sidewalls 98. Cover 80 is placed atop base 78 such that each base tab 82 aligns with and engages a respective cover slot 88. As shown in FIGS. 4, 5, and 6, base 78 may be further provided with peripheral receiving groove 92 which is engaged by peripheral lip 94 projecting from inside surface 96 of cover 80. Lip 94 is offset from sidewalls 98 of cover 80 and follows the entire perimeter thereof. When cover 80 is joined to base 78, lip 94 is received in groove 92 to create a tortuous path between base 78 and cover 80, thereby ensuring that conductive debris cannot enter cluster block 57 through this joint.

Both base 78 and cover 80 are provided with narrow, U-shaped passages 100 formed in the peripheral walls thereof, each of which receives one of the plurality of lead wires 58. Each passage 100 in base 78 communicates with a channel defined in the base by walls 102, each channel being of a length and shape which precisely positions a connector clip 62 directly over conductor pin receiving holes 104 in base 78. Each passage 100 and channel is dimensioned to fit tightly about the insulation of a lead wire 58; notably, channel walls 102 are provided with wire surrounding portions 106 which protrude inwardly, toward and in abutting contact with each lead wire 58. Additionally, integral wire surrounding portions 108 are provided in cover 80. Portions 108 extend from cover inner surface 96 into the portions of the channels in the base formed by wire surrounding portions 106. Wire surrounding portions 108 sealably contact the insulative jackets of lead wires 58, and retain lead wires 58 in a predetermined position between walls 102. Wire jacket-contacting surfaces 110 of wire surrounding portions 108 are concave; when wire surrounding portions 108 contact the surface of lead wires 58, surfaces 110 closely follow the cylindrical contour of the insulative jackets of wires 58 so as not to damage or crimp the wires.

Extending downwardly from base 78 is integrally formed cylindrical portion 112 which is the portion of cluster block 57 which sealably engages the cylindrical inner surface of terminal body 64. In order for connector assembly 54 to effectively prevent debris from contacting the inner surfaces of terminal assembly 50 and to make a good electrical connection 60, cluster block 57 must be properly seated within terminal body 64. The shown embodiment illustrates recess or groove 114 that may be circumferentially disposed in outer surface 116 of cylindrical portion 112 to receive O-ring 118. When cluster block 57 is seated within terminal body 64, conductor pins 56 are aligned with holes 104 in base 78. As cluster block 57 is forced into terminal body 64, the interior ends of pins 56 are engaged by connector clips 62 to provide an electrical connection therebetween. As shown in FIG. 4, O-ring 118 is compressed into groove 114, and provides an interference fit which retains connector assembly 54 to terminal assembly 50, and seals the interface between surface 116 of cluster block 57 and the inner surface of terminal body 64.

Located in outer surface 120 of cover 80 is blind recess 122 which is provided to receive protrusion 124 of installation tool 126 (FIGS. 7–11) as discussed further hereinbelow. Recess 122, formed in cover 80, protrudes inwardly from outer surface 120 and is closed from the inner chamber of cluster block 57 to prevent debris from entering the same. Recess 122 is shown as being rectangular, but may be of any shape suitable to receive tool protrusion 124. Additional recess 123, shown in FIG. 5, may also be provided in cover 80 to receive other tool protrusions (not shown) and aid in the placement of cluster block 57 on tool 126.

Figure 8:
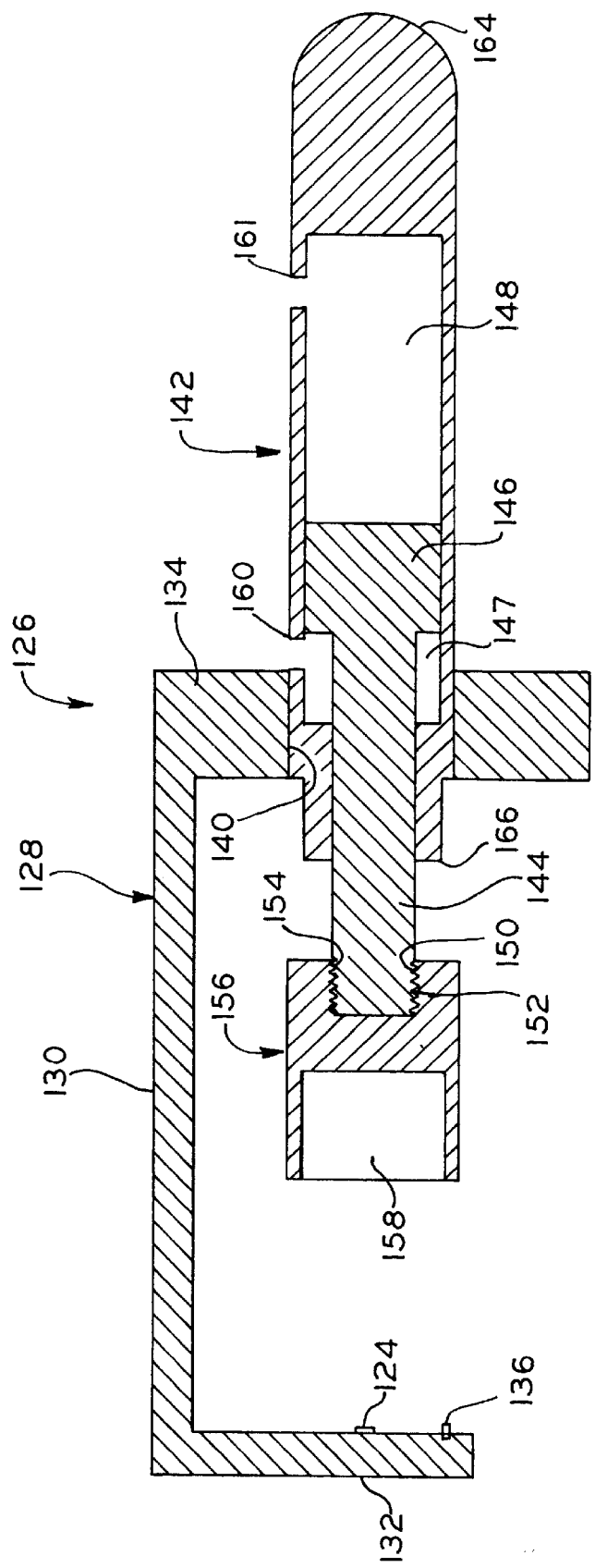
FIG. 8 is a sectional view of the tool of FIG. 7, taken along the line 8—8.

Referring now to FIGS. 7–15, connector assembly installation tool 126 includes integrally formed C-shaped body member 128 having central portion 130 and downwardly depending legs 132 and 134 positioned at each end thereof; C-shaped body member 128 is steel, but may be constructed from any suitably rigid material that is able to withstand repeated use, and is preferably lightweight so that an operator may easily manipulate tool 126. Located on the lower portion of leg 132 is protrusion 124 which is received in blind recess 122. Also located on leg 132 is locating pin 136 which abuts cover outer edge 138 of cluster block 57 to ensure that connector assembly 54 is properly positioned on tool 126 (FIGS. 8 and 10). Although protrusion 124 and locating pin 136 are respectively shown as being rectangular and round in cross section, they may be of any suitable shape.

As best shown in FIG. 8, located within leg 134 of body portion 128 is aperture 140 through which pneumatic cylinder 142 is secured by any suitable method, such as by being threaded. Rod 144 is disposed within cylinder 142 and has piston 146 fixedly attached to one end thereof. Piston 146 slidably, sealingly engages the cylindrical, defining walls of chambers 147 and 148 in pneumatic cylinder 142. Located at the end of rod 144 opposite piston 146 are threads 150 which engage threaded recess 154 of terminal-receiving cup 156. Terminal receiving cup 156 has cavity 158 into which is received the external portion of terminal assembly 50 during installation of connector assembly 54 as described further hereinbelow. The axial surface of cup 156 surrounding cavity 158 is brought into abutment with the outside of compressor housing 24 when installation tool 126 is being actuated.

Figure 14:
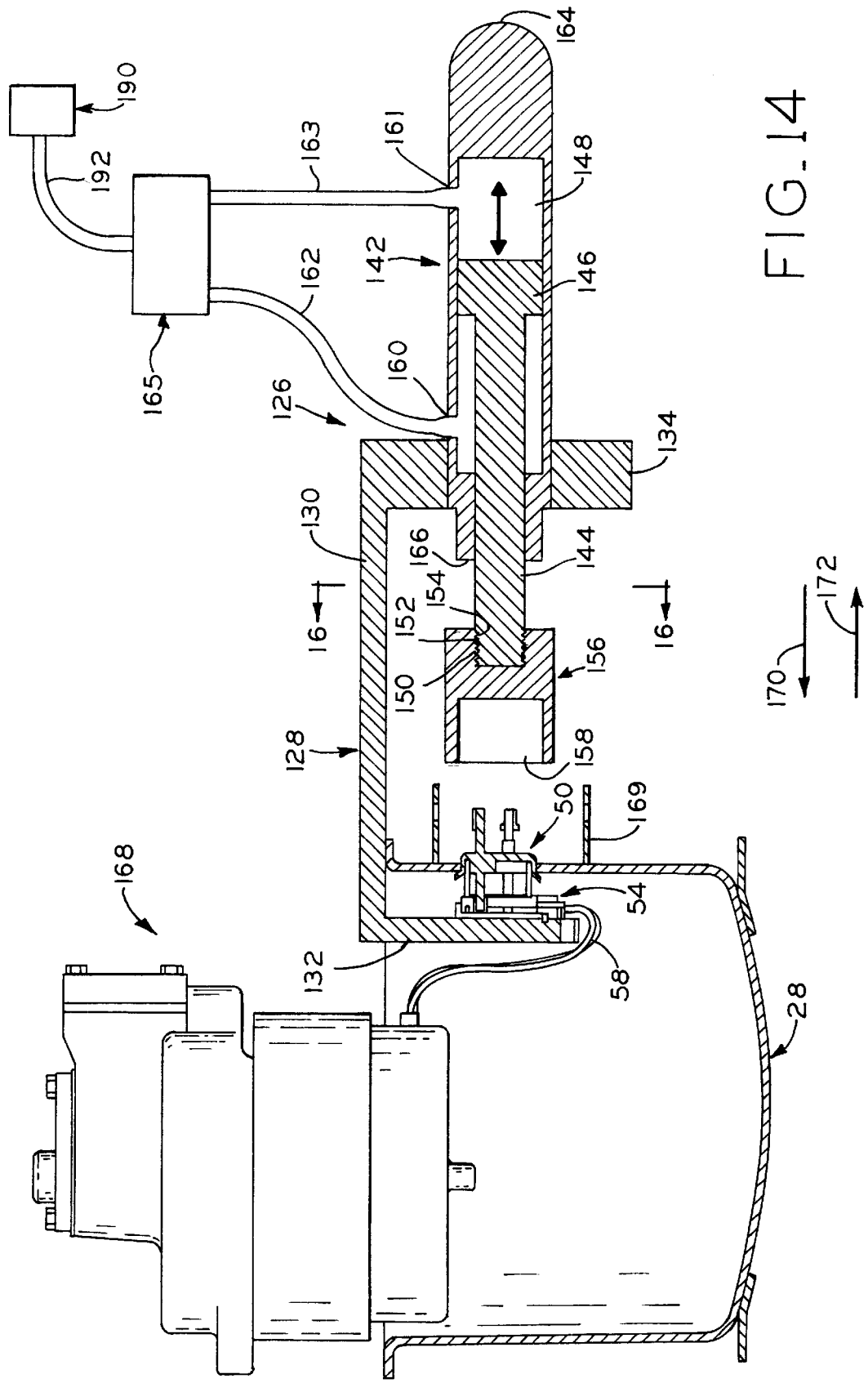
FIG. 14 is a sectional view of the installation tool, compressor assembly housing portion, and compressor/motor subassembly of FIG. 13, in a first tool position.
Figure 15:
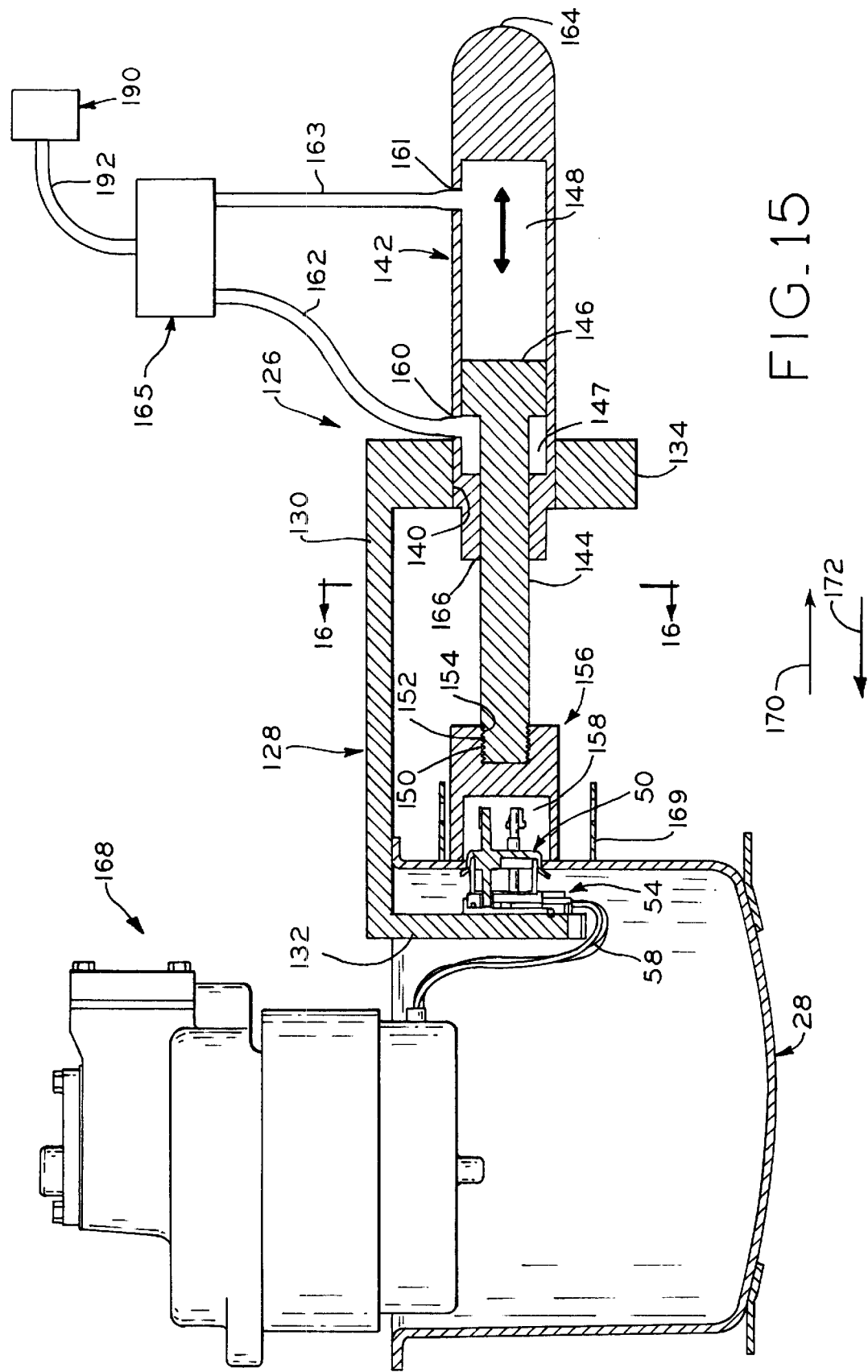
FIG. 15 is a sectional view of the installation tool, compressor assembly housing portion, and compressor/motor subassembly of FIG. 13, in a second tool position.
Figure 16:
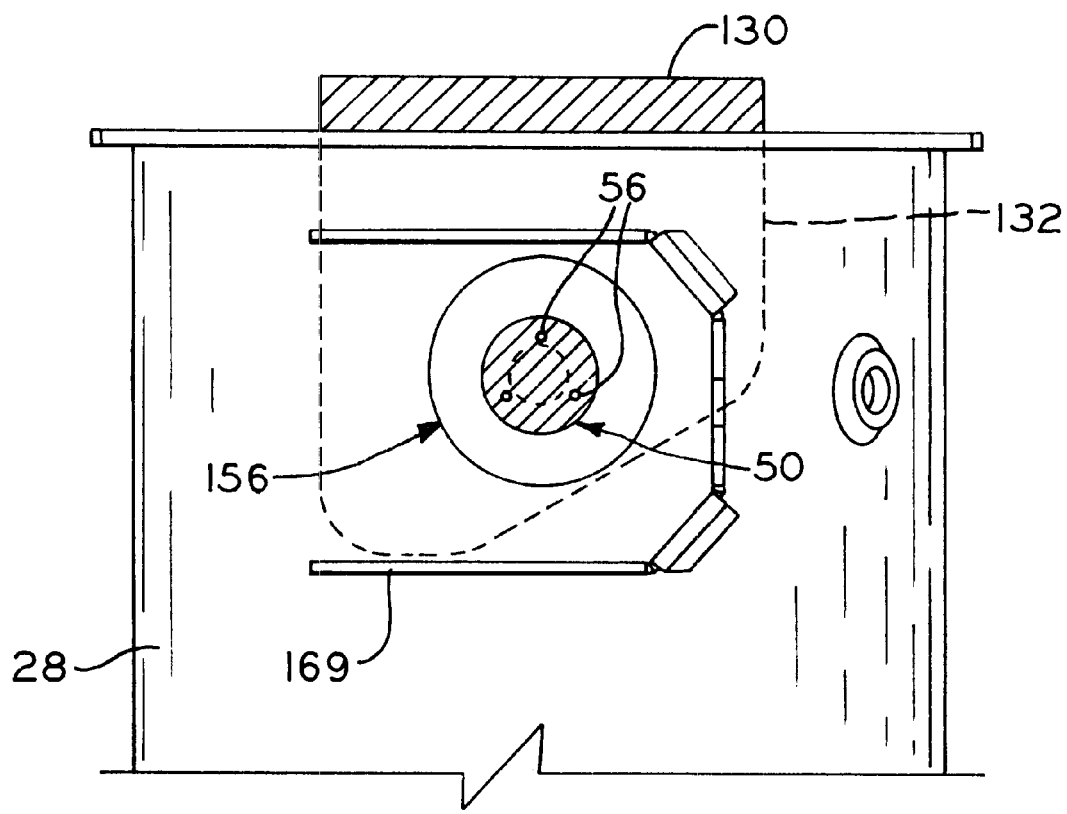
FIG. 16 is a fragmentary sectional view of the installation tool and compressor assembly housing portion of FIG. 14 along the line 16—16.
Figure 17:
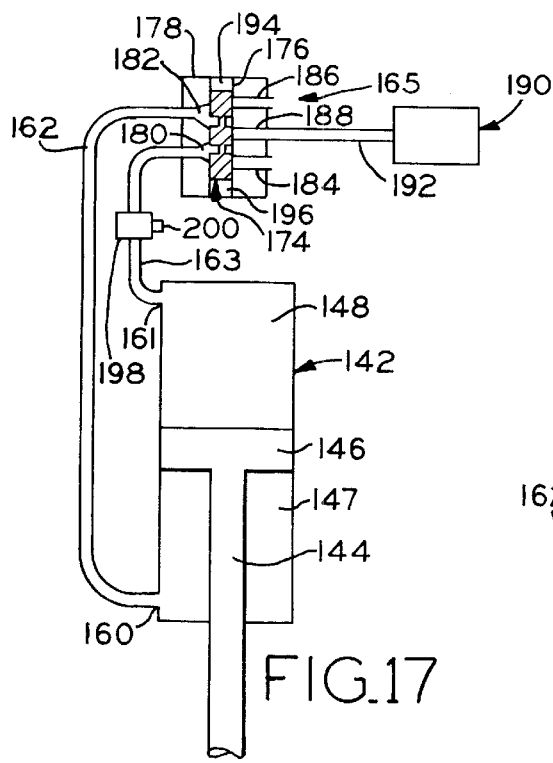
FIG. 17 is a schematic of the pneumatic cylinder and control valve in a neutral position.
Figure 18:
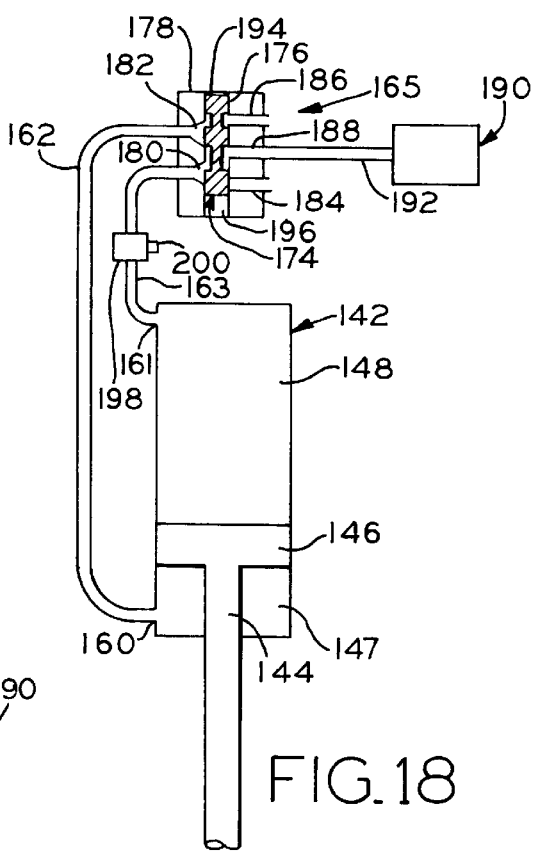
FIG. 18 is a schematic of the pneumatic cylinder and control valve in a first position.
Figure 19:
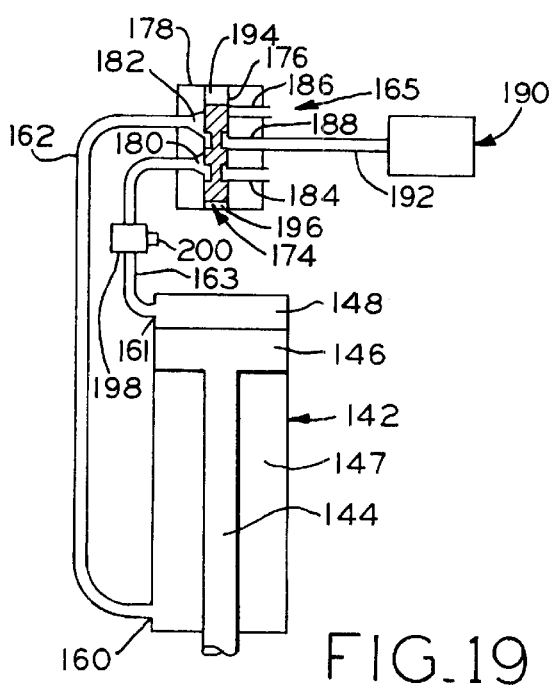
FIG. 19 is a schematic of the pneumatic cylinder and control valve in a second position.

Pneumatic cylinder 142 includes apertures 160 and 161 which communicate with chambers 147 and 148, respectively. Chamber 147 is disposed between piston 146 and end 166 of cylinder 142, and chamber 148 is located near end 164 of cylinder 142. Referring to FIGS. 13, 14, and 15, fluid supply hoses 162 and 163 are secured by any suitable means, such as by threaded engagement in apertures 160 and 161, which respectively provide a passageway into chambers 147 and 148. Control valve 165 receives the opposite end of each supply hose 162 and 163, placing valve 165 in fluid communication with chambers 147 and 148. Referring to FIGS. 17, 18 and 19, control valve 165 includes therein plunger 174 which is disposed in passage 176, substantially extending the length of valve housing 178. Intersecting passage 176 are passages 180 and 182 which permit fluid flow from passage 176 to fluid supply hoses 162 and 163. Extending approximately perpendicularly from the opposite side of passage 176 are exhaust passages 184 and 186 which are open to ambient, as well as input passage 188 which receives fluid from fluid supply 190 through supply hose 192.

Plunger 174 has three positions which determine the path of the fluid into or out of chambers 147 and 148. When in the position shown in FIG. 17, control valve 165 is in a neutral position such that the pressure in portion 194 of passage 176 on one side of plunger 174 is substantially equal to the pressure in portion 196 of passage 176. The pressure centers plunger 174 in passage 176 to close input passage 188. Pressure switch 198 is located in fluid supply line 163 to control the pressure differential between portions 194 and 196 of passage 176 and thus the position of plunger 174. Pressure switch 198 includes a pressure gauge (not shown) for monitoring the pressure within hose 163. Trigger 200 on switch 198 actuates a valve (not shown) located in hose 163 to control the fluid flow in supply hose 163. Pressure switch 198 is shown and described as being operable by air although pressure switch 198 may also be operable by electronic means.

When an operator depresses trigger 200, the valve in hose 163 is actuated, creating a difference in pressure between portions 194 and 196 of passage 176. The pressure in portion 196 of passage 176 is then greater than in portion 194, thereby forcing plunger 174 to the first position illustrated in FIG. 18 in which fluid input passage 188 aligns with, i.e., is placed in fluid communication with, passage 180, thereby allowing fluid to flow into chamber 148 of cylinder 142. Simultaneously, supply hose 162 aligns with exhaust passage 186 such that as fluid flows into chamber 148, forcing piston 146 towards end 166 of cylinder 142, fluid is forced out of chamber 147 to the ambient air. The pressure gauge of pressure switch 198 measures the pressure in supply hose 163. Once the pressure has reached a predetermined level that ensures the seating of cluster block 57, the pressure in portion 194 is made greater than that in portion 196. This causes plunger 174 to slide within passage 176 to its second position shown in FIG. 19. In this position, input passage 188 aligns with passage 182, allowing fluid to flow into chamber 147. In this position, exhaust passage 184 aligns with passage 180 such that as fluid flows into chamber 147, piston 146 is forced towards end 164 of cylinder 142, the fluid in chamber 148 being exhausted to the ambient. Fluid flowing into chamber 147 moves piston 146 until it abuts an interior surface of cylinder 142.

To ensure proper seating of cluster block 57, a predetermined maximum pressure level within chamber 148 is set in the range of 30 to 50 psi, and preferably around 40 psi. This pressure level also determines the point at which plunger 174 moves to its second position. Venting the fluid from chamber 148 when the desired maximum force on the cluster block has been attained is preferable to releasing tool 126 when it reaches a mechanical stop. The tolerances involved when manufacturing and/or assembling certain compressor assembly components can sometimes be substantial. For example, thicknesses of the housing portions may vary from one compressor to the next, as may the distance by which the terminal assembly protrudes from the interior wall of the housing. With significant dimensional differences possible between different compressor assemblies, the predetermined distance of travel for rod 144 would not always be the same for each compressor. Reliance on a mechanical stop to limit the movement of rod 144 might not provide consistent, proper seating of cluster block 57 into terminal body 64.

Pneumatic cylinder 142 may be of a suitable type well-known in the art, such as, for example, a double acting Series SR or SRM stainless steel pneumatic cylinder manufactured by Parker Hannifin Corporation and described in the May, 1986, Schrader Bellows product catalog CYL-SR/SRM, the disclosure of which is expressly incorporated by reference. The specific size of cylinder 142 may be optimally selected based on the force required to properly seat connector assembly 54 into terminal assembly 50, and the amount of fluid pressure available to power the cylinder. It is envisioned that with appropriate revisions to the control apparatus and fluid circuits, pneumatic cylinder 142 may be replaced with a suitable hydraulic cylinder.

Before connector assembly 54 is installed, compressor/motor subassembly is first prepared. Referring to FIGS. 13, 14 and 15, subassembly 168 includes motor 36 and compression mechanism 46. As described above, compression mechanism may be of the reciprocating piston type, the rotary type, or the scroll type. Motor 36 comprises a stator and a rotor, the rotor operatively coupled to the compression mechanism to drive same. In the drawings, subassembly 168 is represented by a polyhedron or other descriptive form. As described above, lead wires 58 are electrically connected to the stator windings, and it is envisioned that the stator would be provided by its manufacturer to the compressor assembly facility with connector assembly 54 already attached thereto.

Once subassembly 168 is complete, and before it is fully installed into housing 24, tool 126 is used to install connector assembly 54 onto terminal assembly 50. The use of tool 126 ensures that cluster block 57 is properly seated within terminal body 64 to effectively prevent carbon deposits from later forming conductive paths between components at different electrical potentials, such as between the unjacketed portions of lead wire 58 and housing 24, or between conductor pins 56 and terminal body 64, to thus preclude arcing.

Before installation of connector assembly 54, during assembly of the housing portions into which the connector assemblies will be installed, terminal assemblies 50 are secured within housing apertures 48 such that conductor pins 56 are consistently oriented in a predetermined angular position relative to the housings. Fence 169 is attached to the exterior of housing 24, about terminal assembly 50, in a predetermined orientation, thereby ensuring that the connector assembly (not shown), by which electrical power is provided to the terminal assembly from the power source, is later properly connected to the conductor pins. Tool 126 properly orients connector assembly 54 to terminal assembly 50, ensuring that the matching of the lead wires to their respective conductor pins is proper. As best illustrated in FIGS. 10 and 11, connector assembly 54 is positioned on leg 132 of tool 126 such that protrusion 124 engages blind recess 122. As shown in FIG. 11, cluster block 57 is installed at an angle with locating pin 136 supporting block 57 along cover outer edge 138.

With cluster block 57 in position on leg 132 of tool 126, tool 126 is placed in its first position relative to housing portion 28, shown in FIGS. 13 and 14, and connector assembly 54 may be loosely assembled onto conductor pins 56, and the angular alignment of cluster block 57 to terminal body 64 is thus established. Subassembly 168 remains outside of housing portion 28 (FIGS. 13, 14 and 15) to provide clearance for tool 126. Once aligned, tool 126 is actuated, and tool terminal cup 156 moves from the first tool position (FIG. 14) to the second tool position shown in FIG. 15 in which terminal cup 156 abuts the exterior surface of housing portion 28, about terminal assembly 50, the exterior ends of conductor pins 56 being received in cavity 158.

With reference to FIGS. 14, 15 and 18, during actuation of tool 126, plunger 174 is aligned with input passage 188 such that fluid from supply 190 is forced into chamber 148 of cylinder 142 through fluid supply hose 163. This forces rod 144 out of chamber 148, advancing terminal cup 156 toward housing portion 28. The pressure in chamber 148 continues to increase, forcing terminal cup 156 against housing portion 28 in the direction of arrow 170 and C-shaped tool body member 128 in the direction of arrow 172, thereby forcing connector assembly 54 into engagement with terminal assembly 50. As the pressure in chamber 148 approaches the predetermined maximum level, cluster block 57 moves further into engagement with terminal body 64 until it is properly seated.

Once the preselected maximum pressure level in fluid cylinder chamber 148 has been reached, connector assembly 54 is fully installed into terminal assembly 50, and plunger 174 in pressure control valve 165 moves to its second position (FIG. 19), allowing fluid within chamber 148 to be vented. Simultaneously, plunger 174 is aligned with input passage 188 such that fluid from pressurized fluid supply 190 is forced into chamber 147 of cylinder 142 through fluid supply hose 162. The fluid entering chamber 147 forces piston 146 to return to the first position of FIGS. 13, 14 and 19. Installation tool 126 is removed from housing 24 so that the assembly of compressor 20 or 22 may be completed in a conventional manner.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of installing a connector assembly relative to a terminal assembly of a hermetic compressor assembly, comprising:

aligning the connector assembly with the terminal assembly;

positioning an installation tool on the connector assembly;

actuating the installation tool;

changing a fluid pressure in the tool; and seating the connector assembly into the terminal assembly when or before the fluid pressure in the tool reaches a selected pressure level.

2. The method of claim 1, further comprising creating sealing engagement between the connector assembly and the terminal assembly.

3. The method of claim 1, further comprising engaging one of a protrusion and a recess on the installation tool with a respective one of a recess and a protrusion on the connector assembly, whereby alignment of the tool with the connector assembly during installation of the connector assembly is ensured.

4. The method of claim 1, wherein the step of changing a fluid pressure in the tool comprises increasing a fluid pressure in the tool, and the selected pressure level is a selected maximum pressure level.

5. The method of claim 1, further comprising:

establishing and maintaining the angular position of the connector assembly relative to the tool prior to seating the connector assembly into the terminal assembly.

6. The method of claim 1, wherein the fluid pressure is changed in a tool first chamber, and further comprising:

closing the tool to engage the tool with the connector assembly and the compressor housing;

changing a fluid pressure in a tool second chamber subsequent to seating the connector assembly into the terminal assembly; and opening the tool to disengage the tool from at least one of the connector assembly and the compressor housing in response to the change in fluid pressure in the tool second chamber.

7. The method of claim 6, further comprising:

exhausting fluid from the tool first chamber in response to an increase in fluid pressure in the tool second chamber; and exhausting fluid from the tool second chamber in response to an increase in fluid pressure in the tool first chamber.

8. The method of claim 6, wherein the tool closes in response to the fluid pressure in the tool first chamber being greater than the fluid pressure in the tool second chamber, and the tool opens in response to the fluid pressure in the tool second chamber being greater than the fluid pressure in the tool first chamber.

9. The method of claim 8, further comprising:

moving a piston between the tool first and second chambers in response to fluid pressure differentials between the fluid pressures in the tool first and second chambers; and effecting opening and closing of the tool through movement of the piston.

10. The method of claim 6, further comprising:

moving a plunger into a first position in which the tool first chamber is placed in fluid communication with a pressurized fluid source, and consequently closing the tool; and moving a plunger into a second position in which the tool second chamber is placed in fluid communication with the pressurized fluid source, and consequently opening the tool.

11. The method of claim 10, further comprising:

placing the tool second chamber in fluid communication with ambient fluid in the plunger first position; and placing the tool first chamber in fluid communication with ambient fluid in the plunger second position.

12. The method of claim 10, further comprising:

selectively actuating a switch in response to which the plunger is moved into its first position.

13. The method of claim 10, wherein the plunger is moved into its second position when fluid pressure in the tool first chamber reaches its selected pressure level.

14. A method of installing a connector assembly relative to a terminal assembly of a hermetic compressor assembly, comprising:

aligning the connector assembly with the terminal assembly;

positioning an installation tool on the connector assembly;

actuating the installation tool;

seating the connector assembly into the terminal assembly; and extending a pneumatic cylinder of the installation tool, and forcing the connector assembly into its seated position relative to the terminal assembly through extension of the pneumatic cylinder.

15. The method of claim 14, further comprising:

increasing fluid pressure within the pneumatic cylinder to a predetermined level, at which level the connector assembly reaches its seated position relative to the terminal assembly; and retracting the pneumatic cylinder after the connector assembly has been seated in the terminal assembly.

16. The method of claim 14, further comprising aligning the connector assembly with the terminal assembly inside a compressor housing of the hermetic compressor assembly, and applying pressure to the connector assembly with a body member of the installation tool and to an outer surface of the compressor housing with the pneumatic cylinder, whereby the connector assembly is forced into engagement with the terminal assembly.

17. A method of installing a connector assembly relative to a terminal assembly of a hermetic compressor assembly, comprising:

aligning the connector assembly with the terminal assembly;

positioning an installation tool on the connector assembly;

pneumatically applying force to the connector assembly through the installation tool until a predetermined pneumatic pressure has been reached;

seating the connector assembly into the terminal assembly when or before the predetermined pressure has been reached; and retracting the tool after the connector assembly has been seated into the terminal assembly.

18. The method of claim 17, further comprising engaging one of a protrusion and a recess on the installation tool with a respective one of a recess and a protrusion on the connector assembly, whereby alignment of the tool with the connector assembly during installation of the connector assembly is ensured.

19. The method of claim 17, further comprising sealingly engaging the connector assembly and the terminal assembly.

20. The method of claim 17, further comprising aligning the connector assembly with the terminal assembly inside a compressor housing of the hermetic compressor assembly, and applying pressure to the connector assembly with a body member of the installation tool and to an outer surface of the compressor housing with the pneumatic cylinder, whereby the connector assembly is forced into engagement with the terminal assembly.

* * * * *